May 31, 1966 R. D. CUMMINS 3,253,611
CONTROLLER FOR CRYOGENIC LIQUIDS
Filed Nov. 13, 1962 2 Sheets-Sheet 1
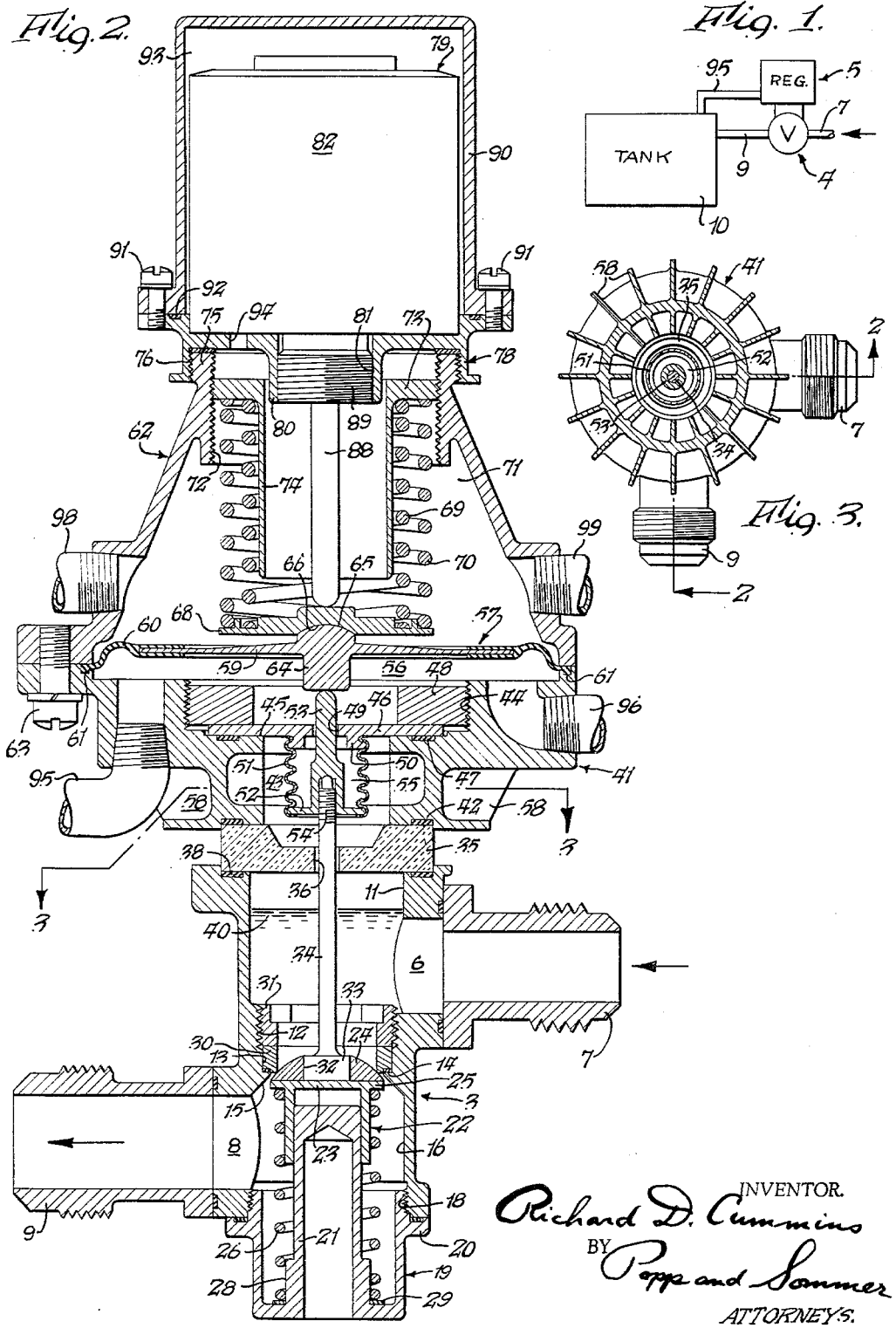
INVENTOR.
Richard D. Cummins
BY Popp and Sommer
ATTORNEYS.

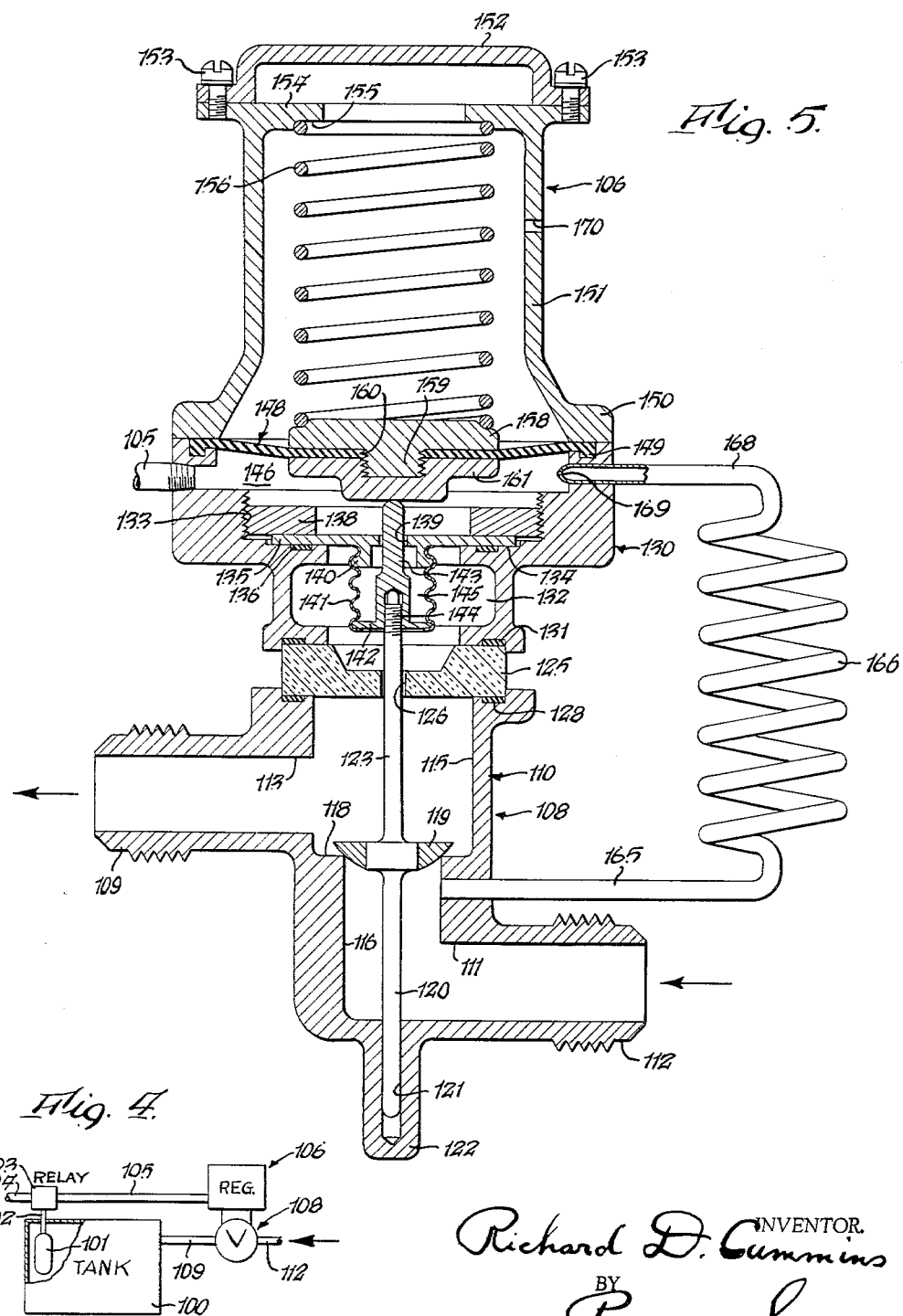

United States Patent Office 3,253,611
Patented May 31, 1966

3,253,611
CONTROLLER FOR CRYOGENIC LIQUIDS
Richard D. Cummins, Hamburg, N.Y., assignor to The Firewell Company, Inc., Buffalo, N.Y., a corporation of Ohio
Filed Nov. 13, 1962, Ser. No. 237,214
7 Claims. (Cl. 137—338)

This invention relates to a flow controller for cryogenic liquids, such as liquid nitrogen, oxygen or other liquids normally in gaseous form and which in a liquid state are at very low temperatures and which may be subject to violent ebullition on passing through a flow control valve and in conjunction with which, with present elastomers, the control section of the valve must be thermally isolated from the flowing liquid to the extent necessary to insure against malfunctioning.

The principal object of the present invention is to provide a controller for the flow valve of cryogenic liquids which can be remotely controlled to maintain the required liquid flow within a very close range, including cutting off the flow completely.

Another object is to provide such a controller which can be responsive to the pressure or temperature of the output of the flow valve or to any other controlling factor.

Another object is to provide such a controller which is responsive to gas pressure, such as from the pressure in the tank being served, or such as from the pressure in a Sylphon tube in which vapor pressure is generated in response to rising temperature of the cryogenic liquid.

Another object is to provide such a controller responsive to gas pressure control which functions through a diaphragm made of an elastomer that would be inoperative at the temperature of the cryogenic liquid being handled, a feature of the invention being a thermal isolation of the controller and its diaphragm from the flow control valve body for the cryogenic liquid.

Another object is to provide such flow valve and controller which will withstand the violent ebullition of the cryogenic liquid passing through the valve, a splash guard, also serving as thermal insulation, separating the controller section from the flow valve section.

Another object is to provide such a flow valve and controller which can be located in a high temperature environment, such as in an ambient of 500° F.

Another object is to provide such a controller which can be made independent of local conditions, such as local ambient or local liquid discharge pressures, which can be irregular and inaccurate.

Another object is to provide such a valve in which the pressure against the valve head can be reduced to any desired degree, such compensation being through a bellows which can be designed to have any desired effective size in relation to the effective size of the valve head.

Another important object of the invention is to provide a way of purging the controller of moisture or moisture containing gas, such moisture being subject to freezing at the low temperatures induced by the cryogenic liquid and being liable to interfere with the proper functioning of the diaphragm or other control element.

Another object is to provide a form of the invention in which such purging is continuous, this being accomplished by heating small amounts of the cryogenic liquid to vaporize the same and then bleeding small amounts of the vapor into the controller section.

Another important object is to provide such a controller which acts as a safety valve to prevent excessive pressures from building up at the inlet of the valve such as can occur due to rapid boil off following closing of the valve.

Another object is to provide such a controller including a spring loaded diaphragm in which the action of the diaphragm is not influenced by off center pressure of the spring loading against the diaphragm and also in which the diaphragm is not twisted in adjusting the spring pressure.

Another object is to provide a valve in which the flow can be reversed, such reversal, however, resulting in different action of the valves.

Another object is to provide a gas-proof isolation of the diaphragm from the cryogenic liquid but which does not interfere with exact control of the flow valve by the diaphragm.

Another object is to provide a solenoid capable of acting to free the controller from ice or as a remote manual or other control for opening the flow valve.

Another object is to provide such a controller which is simple and rugged in construction and which will stand up under conditions of severe and constant use without getting out of order or requiring repairs.

Other objects and advantages will be apparent from the following description and drawings in which:

FIG. 1 is a diagram in block form of one form of the invention shown as serving a tank to maintain a predetermined pressure therein.

FIG. 2 is a vertical longitudinal central section through the form regulator for cryogenic fluids as illustrated in FIG. 1.

FIG. 3 is a diminutive transverse section taken generally on line 3—3, FIG. 2.

FIG. 4 is a view similar to FIG. 1 of another form of the invention shown as serving a tank to maintain a predetermined temperature therein.

FIG. 5 is a simplified view similar to FIG. 2 illustrating the modified form of the invention illustrated in FIG. 4.

In the form of the invention illustrated in FIGS. 1–3, the numeral 3 represents the hollow body of a flow valve 4, the regulator for which is indicated generally at 5. The valve body 3 is shown as having an inlet 6 at one end connected with an inlet line 7 and having a lateral outlet 8 at its opposite end connected with an outlet line 9. It will be assumed, purely as exemplary of the uses of the controller, that liquid nitrogen is supplied at the inlet 7 at a pressure of from 30 to 50 p.s.i.g. and at a temperature in the order of −320° F. and that it is desirable to control the pressure in the tank 10 served by the outlet line 9 to be 28 p.s.i.g. It will further be assumed that the valve 4 and the parts of the regulator 5 connected therewith operate in an ambient temperature of 500° F. and that it is important that the pressure in the inlet 6 of the valve 4 be prevented from rising much above the above normal pressure, a feature of the invention being that the valve parts in the valve 4 act as a safety valve to prevent excessive pressures developing in the inlet 6 due to boil off on closing the valve.

The hollow interior of the valve body 3 is shown as being in the form of a vertical through bore comprising an enlarged cylindrical upper end bore 11 communicating with the inlet 6 and a threaded bore 12 leading downwardly from the bottom of the upper end bore 11 and terminating at its bottom in a cylindrical counter bore 13 the lower end of which is formed by an upwardly facing annular seat 14 surrounding the valve opening 15 which forms the upper end of a lower end bore 16 communicating with the outlet 8 and the lower end of which is internally threaded as indicated at 18.

Into this lower threaded end 18 is screwed a closure in the form of a cup-shaped cap 19, an external rim 20 of which is seated against the underside of the valve body 3 and which cap is formed to provide an internal, upstanding, concentric, hollow cylindrical stem 21 which is shown as open at its bottom to ambient. On the exterior of this stem is slidingly mounted a spring guide and valve head follower 22, this guide or follower being shown as being in the form of a cylinder which is open at its bottom to receive the stem 21 and having a closed top 23 to support the valve head 24 and to provide an outwardly projecting horizontal annular flange 25 against which the upper end of a vertical helical compression spring 26 is biased. This spring surrounds and is positioned by this spring follower 22 and the lower enlarged end 28 of the upstanding stem 21 and the force of this spring is determined by one or more shims 29 interposed between its lower end and the bottom of the closure.

The valve head 24 seats against a ring 30 held against the shoulder 14 by an externally threaded ring 31 screwed into the threads 12. The valve head is shown as provided with a central bore 32 in which is press fitted the head 33 of a valve stem 34 which projects upwardly through the open upper end of the upper end bore 11 of the hollow interior of the valve body 3.

This open upper end is closed by a disk 35 of heat insulating material, preferably being made of glass and mica molded into the form of a thick disk and having a central opening 36 through which the valve stem 34 projects and having the bottom of its rim seated against a gasket 38 surrounding the open upper end of the cylindrical upper end bore 11 so as to provide a splash guard for the liquid nitrogen or other cryogenic liquid 40 contained therein.

The body 41 of the regulator 5, which also forms a heat exchanger, seats against the top of the marginal part of the splash guard and thermal insulation disk 35, a gasket 42 being interposed therebetween. The regulator and heat exchange body 41 is hollow and formed to provide a lower heat exchange chamber 43 which is open at its bottom to communicate via the passage 36 with the cylindrical upper end bore 11 of the valve body 3.

The controller and heat exchange body 41 has an internally threaded counterbore 44 forming an upwardly facing annular seat 45 surrounding the upper end of the heat exchange or bellows chamber 43. A metal disk 46 is held downwardly against a gasket 47 on the seat 45 by a screw ring 48 in the threaded bore 44, and this disk 46 has a central opening 49 and a downwardly projecting outwardly beaded annular flange 50 to the exterior of which is secured, as by welding, the upper end of an axially extensible metal bellows 51, this bellows preferably comprising a series of circular corrugations for this purpose. This bellows is preferably thin walled and for this purpose made of nickel electro-deposited upon erodible form (not shown) which is later removed. The lowest corrugation of this bellows is secured, as by welding, to the rim of a disk 52 which is integral with a pin 53 which projects upwardly through the opening 49 in the disk 46. The upper end of the valve stem 34 is secured, as by threads 54, to the lower end of the pin 53 and the chamber 55 within the bellows 50 is in communication, via the opening 49, with a diaphragm or control chamber 56 below a diaphragm indicated generally at 57.

An important feature of the invention is the provision of an extended surface or fins 58 on the exterior of the heat exchange and controller body 41, these fins preferably being formed integrally therewith and being radial, and exposed to ambient which, as previously indicated, can be as high as 500° F. as compared with the assumed —320° F. temperature of the liquid nitrogen 40 contained within the upper end bore 11 of the valve body 3.

This diaphragm 57 is shown as comprising a central metal disk 59 to which a flexible rim 60 is suitably secured, this rim having a marginal bead 61 clamped against the top face of the heat exchange and controller body 41 around the control or diaphragm chamber 56 by an upper end head 62 for the heat exchange and controller body 41 which can be secured thereto in any suitable manner, as by the screws 63.

The disk 59 of the diaphragm 57 is shown as having a central hub 64 which bears downwardly on the upper end of the pin 53 and is shown as having a spherical face 65 on its top. This spherical face 65 engages the mating spherical under face 66 of a spring loaded disk 68 the marginal portion of which supports the lower convolutions of an inner helical compression spring 69 and an outer helical compression spring 70, the springs being wound in opposite directions to avoid interfering with each other, and the purpose of two light springs instead of a single heavy spring being to reduce the spring rate.

These springs are contained in the chamber 71 formed in the upper end head 62 of the controller 5 above the diaphragm 57 and the upper open end of this chamber is formed by an internally threaded bore 72 in which is screwed an externally threaded ring 73. The upper ends of the convolutions of the helical compression springs 69 and 70 bear against the underside of this ring and this ring is also formed to provide an open ended sleeve 74 which forms a guide for the inner helical compression spring 69.

The neck 75 at the upper end head 62 for the controller body 41 is externally threaded, as indicated at 76, and on these threads is screwed the internally threaded annular base 78 of a solenoid indicated generally at 79. The base 78 is shown as having a central neck 80 projecting downwardly into the ring 73 and having an internally threaded vertical through bore 81. The body 82 of the solenoid 79 is shown as having a downwardly projecting externally threaded neck 89 screwed into the threads 81. To the vertically movable core (not shown) of this solenoid 79 is secured a tappet rod 88 projecting downwardly through the neck 80 and engageable with the spring disk 68 which is biased downwardly against the diaphragm 57 by the helical compression springs 69 and 70.

The solenoid 79 is enclosed by a cap 90 secured to the rim of the base 78 as by screws 91, a sealing gasket 92 being interposed between the base and cap. The cap therefore forms, with the base, a chamber 93 which is in communication with the chamber 71 in the upper end head 62 via an opening 94.

The diaphragm 57 is actuated by pressure variations in a remote reference control line 95 which is in communication with the control diaphragm chamber 56 and the pressure within which can be responsive to pressure variations in the tank 10 being served by the outlet 9 of the valve. A purge line 96 can also communicate with the control or diaphragm chamber 56 and through which the chamber 56 can be purged, particularly from moisture.

The chamber 71 on the upper side of the diaphragm 57 is maintained at ambient via a line 98, the purpose of such ambient line being to provide a remote ambient reference unaffected by ambient conditions immediately surrounding the controller 5. The chamber 71 can also be provided with a purge line 99, particularly to purge this chamber from moisture which could interfere with the operation of the diaphragm 57.

As previously indicated, it is assumed that the flow valve 3 and its controller 5 is being operated in an ambient temperature as high as 500° F. and that a cryogenic fluid, such as liquid nitrogen, is being supplied through the inlet line 7 at a temperature of —320° F. and at a pressure of 30–50 p.s.i.g. It is also assumed that the tank 10 being served is to be maintained at a pressure of 28 p.s.i.g. and that the top of this tank is connected by the line 95 to the diaphragm chamber 56.

When the valve head 24 is in its lowered open position or unseated from the ring 30, the liquid nitrogen from the valve inlet 7 flows past the rings 31 and 30 into the lower bore 16 and outlet 8 of the flow valve and thence through the outlet line 9 into the tank 10 being served. The buildup of pressure in this tank is reflected through the control line 95 into the diaphragm chamber 56. This raises the diaphragm 57 against the resistance of the air and of helical compression springs 69 and 70, this force being transmitted through the semispherical surfaces 66 and 65 between the hub 64 of the diaphragm 57 and the plate 68 supporting the lower ends of the helical compression springs 69 and 70. By virtue of the spherical faces 65 and 66 the spring supporting plate 68 and diaphragm plate 59 are free to rock with reference to each other so that any unbalance in the pressure of the springs 69, 70 which would tend to load the diaphragm 57 eccentrically is not transmitted to the diaphragm so as to load one side or the other. These spherical faces also prevent twisting distortion of the elastomer 60 of the diaphragm by the springs 69, 70 when these springs are adjusted by turning the threaded ring 73. Also by the use of two springs 69 and 70 instead of a single spring the spring rate is reduced and by their being wound in opposite directions there is no interference between these springs in either action. During this movement the rod 88 connected to the movable core (not shown) of the solenoid 79 is raised, this solenoid being deenergized.

The lifting of the hub 64 of the diaphragm 57 relieves its downward pressure against the pin 53. As a result, the pressure of the helical compression spring 26 lifts the follower or guide sleeve 22 thereby to move the valve head 24 upwardly toward its closed position and also lifting the valve stem 34 connecting this valve head 24 with the pin 53. When the pressure in the tank 10 being served reaches the assumed desired pressure of 28 pounds, this pressure, transmitted through the line 95 into the diaphragm chamber 56, lifts the diaphragm 57 sufficiently far so that the spring 26 has completely closed the valve head 24 thereby to cut off the flow of liquid nitrogen into the tank being served.

When this tank pressure drops below the assumed value of 28 pounds p.s.i.g., this pressure, transmitted through the control line 95 into the diaphragm chamber 56 causes the diaphragm to move downwardly by virtue of the pressure of the springs 69 and 70 and this downward pressure exerted through the pin 53 and valve stem 34 moves the valve head 24 to an open position against the resistance of the helical compression spring 26, this open position of the valve head 24 being maintained until the pressure in the tank 10 being served again builds up to the assumed desired value of 28 p.s.i.g.

The adjustment of the pair of helical compression springs 69 and 70 which serve to so move the valve head 24 to an open position is effected by adjustment of the screw ring 73 against which the tops of these springs are seated and the adjustment of the effect of the helical compression spring 26 which serves to close the valve head 24 is adjusted by increasing or decreasing the number of shims 29 against which the bottom of this spring is seated.

On closing the valve head 24 a rapid boiloff of the liquid nitrogen 40 can occur in the cylindrical upper end bore 11 which can cause the development of an excessively high pressure therein and a feature of the invention resides in the provision of relief valve action of the valve head 24. Thus, when the pressure in this cylindrical upper end bore 11 rises above the value of the spring 26, this pressure opens the valve head 24 and permits the escape of fluid to the outlet line 9 thereby to prevent excessively high pressure from developing in the cylindrical upper end bore 11 as well as the parts of the controller exposed to this pressure.

The level of the liquid nitrogen 40 in this cylindrical upper end bore 11 is indicated in FIG. 2 but on flowing through the valve this liquid nitrogen in this bore is subject to violent ebullition against which the molded mica-glass disk 35 acts as a splash guard to prevent the entry of any substantial quantity of the boiling nitrogen in the cylindrical upper end bore 11 from entering the heat exchange chamber 43. Such minute quantities of liquid nitrogen as might escape upwardly through the oversize bore 36 immediately evaporates or drains back into the valve body 40.

Accordingly, the atmosphere in the heat exchange chamber 43 is nitrogen at the same pressure as the pressure within the cylindrical upper end bore 11 but this high pressure nitrogen is isolated from the control diaphragm chamber 56 by the thin-walled bellows 51 welded at its top to the disk 46 and at its bottom to the pin 53 which is connected at its lower end to the valve stem 34 and at its upper end contacts and is actuated by the diaphragm 57. Accordingly, the controlling pressure within the control or diaphragm chamber 56 is sealed from the high pressure nitrogen supply while at the same time simple and effective means are provided for transmitting slight movements of the diaphragm 57 to the valve head 24.

A feature of the invention resides in thermally insulating the heat exchange body 41 of the controller 5 from the cold liquid nitrogen being controlled and also heating this body so as to preserve the proper operating characteristics of the elastomer section 60 of the diaphragm. To this end the splash guard disk 35 is made thick and made of a material having poor thermal conductivity, namely, a frit of molded glass and mica. Accordingly, the controller body 41 does not take on the extremely low temperature of the valve body 3 carrying the liquid nitrogen at the assumed —320° F. Further, to protect the diaphragm 57, this heat exchange and controller body 41 is heated. To this end it is provided with the large number of external fins 58 which, especially when exposed to the assumed ambient of 500° F., maintains the temperature of this body 41, and hence the structure associated with this body, particularly the elastomer diaphragm 57, at a temperature very much higher than the liquid nitrogen being handled.

Notwithstanding, the temperature developing within the controller chambers are below the freezing point of water and it is desirable to be able to purge these chambers of any moisture-laden air so that this moisture cannot freeze and impair the operation of the controller. To this end the purge pipe 96 can be provided through which any moisture laden gas in the control chamber 56 can be driven out, as by introducing nitrogen gas from the nitrogen tank 10 for this purpose. Likewise, the chamber 71 can be purged of moisture laden air by introducing a purging gas into the line 99, the gas within the chamber 71 being driven out through the line 98 leading to ambient.

This line leading to ambient is usually desirably of substantial length so that the reference of the chamber 71 to ambient is remote from the flow control valve and is not subject to variations in localized conditions induced by the presence of the flow control valve.

Notwithstanding, if the diaphragm 57 or other parts should ice up, means are provided for knocking the ice free so as to render the controller and flow valve operative. To accomplish this the solenoid 79 is energized so that the rod 88 connected to its movable core (not shown) is driven downwardly with a sharp tap. This sharp impact downwardly against the spring base plate 68, diaphragm hub 64, pin 53, valve stem 34, valve head 24, spring guide or follower 22 and spring 26 serves to break any ice crystals connected with these parts or with the elastomer section 60 of the diaphragm 57 and thereby restore the controller to an operative position.

Also, of course, the solenoid 79 provides a remote control for opening and holding open the valve head 24 should manual control become necessary or desirable.

It will also be particularly noted that the bellows 51 partially compensates the valve head 24 for inlet pressure variations thus reducing the size of the relief spring 26 and rendering the valve more sensiitve. Thus with the inlet at 7, the effective size of the end head 52 of the bellows 51 should be less than the effective size of the valve head 24 to partially counterbalance the inlet pressure of the nitrogen against the valve head. If the effective size of the bellows end head 52 were equal to the effective size of the valve head 24, the relief spring 26 would not work.

It will also be seen that the flow through the valve can be reversed, that is, with the inlet at 9 and the outlet at 7, but that in that event it would not act as a relief valve since the spring 26 would be inoperative. Also on such reversal, the effective size of the bellows end head 52, should be equal to or greater than the effective size of the valve head 24. By adjusting the relative effective sizes of the bellows end head 52 and the valve head 24, the net forces against the valve head can be adjusted to any desired value.

The form of the invention illustrated in FIGS. 4 and 5 is designed to maintain a predetermined low temperature in the tank 100 being supplied with a cryogenic liquid for this purpose and in which tank liquid a Sylphon tube 101 is immersed. This Sylphon tube contains a liquid which vaporizes at temperatures above the predetermined temperature to pressurize its control line 102 and actuate a pneumatic relay 103 to admit pressure from a supply line 104 to its outlet line 105 and thence to the controller 106 for the flow valve 108 which through its outlet line 109 supplies the cryogenic liquid to the tank 100.

The hollow body 110 of the flow valve 108 has a lateral inlet opening 111 at its lower end connected with an inlet 112 and having a lateral outlet 113 at its opposite end connected with the outlet line 109. It will be assumed, purely as exemplary of the use of the controller, that liquid nitrogen is supplied at the inlet 111 at a pressure of from 30 to 50 p.s.i.g. and at a temperature in the order −320° F. and that it is desirable to control the temperature in the tank (100) served by the outlet line 109. It will further be assumed that the valve body 110 and the regulator 106 connected therewith are in an ambient temperature of 500° F.

The hollow interior of the valve body 110 is shown as being in the form of a vertical bore having an enlarged cylindrical upper end bore 115 open at its upper end and communicating with the outlet 113 and a smaller cylindrical lower end bore 116 thereby to provide a shoulder 118 therebetween forming an upwardly facing annular valve seat for a valve head 119. To the valve head 119 is fixed a downwardly projecting valve stem 120 guided in a bore 121 in a boss 122 projecting downwardly from the bottom of the valve body and an upwardly projecting valve stem 123 which projects upwardly through the open upper end of the upper end bore 115 of the valve body.

This open upper end is closed by a disk 125 of heat insulating material, preferably being made of glass and mica molded into the form of a thick disk and having a central opening 126 through which the valve stem 123 projects and having its bottom seated against a gasket 128 surrounding the open upper end of the cylindrical upper end bore 115 so as to provide a splash guard for the liquid nitrogen or other cryogenic liquid passing through the valve body 110. The body 130 of the regulator 106 seats against the top of the marginal part of the splash guard and thermal insulation disk 125, a gasket 131 being interposed therebetween. The regulator body is hollow and formed to provide a lower heat exchange or bellows chamber 132 which is open at its bottom to communicate via the passage 126 with the cylindrical upper end bore 115 of the valve body 110. The control body has an internally threaded counterbore 133 forming an upwardly facing annular seat 134 surrounding the upper end of the cold or bellows chamber 132.

A metal disk 135 is held downwardly against a gasket 136 on the seat 134 by a screw ring 138 in the threaded bore 133, and this disk 135 has a central opening 139 and a downwardly projecting outwardly beaded annular flange 140 to the exterior of which is secured, as by welding, the upper end of an axially extensible metal bellows 141, this bellows preferably comprising a series of circular corrugations for this purpose. This bellows is preferably thin-walled and for this purpose made of nickel electro-deposited upon an erodible (not shown) form which is later removed. The lowest corrugation of this bellows is secured, as by welding, to the rim of a disk 142 which is integral with a pin 143 which projects upwardly through the opening 139 in the disk 135.

The lower end of the pin 143 is secured, as by threads 144, to the upper end of the valve stem 123 and the chamber 145 within the bellows 141 is in communication, via the opening 139, with a diaphragm chamber 146 below a diaphragm indicated generally at 148.

The diaphragm 148 is shown as having a marginal bead 149 clamped between the top face of the control body 130 around the diaphragm chamber 146 by the bottom rim 150 of a cylinder 151 forming a spring housing, the upper end of the cylinder 151 being closed by an upper end head 152 secured thereto by screws 153 or in any other suitable manner and the spring housing 151 having an inwardly projecting flange 154 at its upper end forming a downwardly facing seat 155 for a helical compression spring 156.

The lower end of the helical compression spring 156 seats against a metal disk 158 having a threaded stem 159 projecting downwardly through a central opening 160 in the diaphragm 148. This valve disk 158 is secured to the center of the diaphragm 148 by a clamping disk 161 screwed onto the threaded stud 159 and clamping against the underside of the diaphragm 148.

A feature of the form of the invention shown in FIGS. 4–5 resides in the continuous purging of the control or diaphragm chamber 146 by heated nitrogen gas to prevent any moisture from accumulating in the diaphragm chamber.

To this end an outlet pipe 165 communicates with the inlet side 111 of the valve body 110 and delivers liquid nitrogen to a heating coil 166 the opposite end of which connects with a line 168 discharging, via a restricted orifice 169, into the control or diaphragm chamber 146.

To this diaphragm chamber 146 is also connected the control line 105 leading to the relay 103 responsive to the temperature of the tank 100 to be served, the small amount of heated gaseous nitrogen permitted to escape from the restricted orifice 169 thereby passing through this control line 105 to escape through the relay 103.

The interior of the spring housing 151 can be maintained at ambient either locally, as by a vent 170 or remotely, as by a line (not shown) connected with this vent.

The function of the flow valve and controller illustrated in FIGS. 4 and 5 is to maintain a predetermined temperature in the tank 100. When this temperature is lower than the setting of the controller, the valve head 119 is open and hence liquid nitrogen from the supply line 112 flows past the unseated valve head 119 through the outlet line 109 into the tank 100 being served. The resulting drop in temperature within this tank causes the condensation of the fluid contained within the Sylphon tube 101, this in turn through the relay 103 reducing the pneumatic pressure from supply line 104 to line 105 and in the control or diaphragm chamber 146 of the controller 106. As a consequence of reduced pressure within this controller chamber 146 the helical compression spring 156 depresses the diaphragm 148 and its central clamping plates 158 and 161 thereby to depress the pin 143. This lowers the valve stem 123 attached to the bottom of this pin 143 thereby to lower the valve head 119 toward its closed position on the seat 118. When the temperature in the tank reaches the setting of the controller 106, the valve head 119 reaches its closed position.

When the temperature in the tank 100 subsequently rises, the fluid contained within the Sylphon tube 101 rises to vaporize and increase in pressure. Through the relay 103, pneumatic pressure from the supply line 104 is introduced through the line 105 to the control chamber 146 against the resistance of the diaphragm 148 loaded by the helical compression spring 156. As a consequence, inlet pressure of the liquid nitrogen in the chamber 111 below the valve head 119 lifts this valve head to permit the liquid nitrogen to flow through the valve into the tank 100 to again lower the temperature in this tank to repeat the cycle as previously described.

As with the form of the invention shown in FIGS. 1–3, the molded mica-glass disk 125 acts as a splash guard to prevent any substantial quantity of the boiling nitrogen in the upper chamber 115 of the valve body 110 from entering the heat exchange or bellows chamber 132. Such minute quantities of liquid nitrogen as might escape upwardly through the oversize bore 126 immediately drains or evaporates back into the upper chamber 115 of the valve body. Accordingly, the atmosphere in the heat exchange chamber 132 is nitrogen at the same pressure as the pressure in the upper chamber 115 of the valve body 110, but this high pressure nitrogen is isolated from the control or diaphragm chamber 146 by the thin walled bellows 141 welded at its top to the disk 135 and at its bottom to the pin 143 which is connected at its lower end to the valve stem 123 and at its upper end contacts and is actuated by the diaphragm 148. Accordingly, the controlling pressure within the control or diaphragm chamber 146 is sealed from the high pressure nitrogen supply while at the same time simple and effective means are provided for transmitting slight movements of the diaphragm 148 to the valve head 119.

With the form of the invention shown in FIGS. 4 and 5 continuous means are provided for purging the control or diaphragm chamber 146 from moisture or moisture laden gas. To this end minute amounts of liquid nitrogen are permitted to escape from the inlet side 111 of the valve body 110 to the heating coil 166 via line 165. In this heating coil the nitrogen is heated and vaporizes and escapes past the restricted orifice 169 into the control chamber 146 to be relieved through the relay 103. The nitrogen so introduced into the control chamber 146 is relieved through the relay each time the temperature in the tank 100 drops to the setting of the controller at which time the pressure within the control chamber is reduced, via the relay 103 under control of the Sylphon tube 101 to permit the helical compression spring 156 to close the valve head 119. It will also be seen that since the valve head 119 is spring biased to its closed position it will act as a relief valve to prevent the build up of intensive pressures on the inlet side of the valve through rapid boil off on closing the valve.

It will particularly be noted that with the form of the invention shown in FIGS. 4 and 5 with the inlet at 112 and the outlet at 109, the bellows compensates the valve head 119 against outlet pressure variations, making the regulator insensitive to such changes. Thus the effective size of the end head 142 of the bellows 141 can be greater, less or equal to the effective size of the valve head 119 to obtain any desired compensation of outlet pressure and variations of relief, as well as reversal of flow. Thus if the effective size of the bellows end head 142 is greater than the effective size of the valve head 119, with the inlet at 112 and the outlet at 109, the valve is rendered self energizing in that once the valve head 119 is cracked away from the valve seat, the pressure in the chamber 132 acts against the spring 156 in opening the valve. Also if the effective size of the bellows end head 142 is greater than the effective size of the valve head 119, with the inlet at 112 and the outlet at 109, the spring 156 acts as a relief spring to permit opening of the valve head 119 on excessive inlet pressures at 112. If the effective area of the bellows end head 142 is less than or equal to the effective area of the valve head 119, with 109 as the inlet, the spring 156 would not act as a relief spring. Also if the effective size of the bellows end head 142 is greater than the effective size of the valve head 119, the flow through the valve can be reversed, that is, from 109 to 112 and the spring 156 will then act as a relief spring permitting opening of the valve head 119 in response to excessive inlet pressures. If the effective size of the bellows end head 142 is equal to the effective size of the valve head 119, either 109 or 112 can be the valve inlet, and if 112 is the inlet there will be no effect against the valve head 119 from variations in outlet pressure.

From the foregoing it will be seen that the present invention provides a very simple and effective control for the flow of cryogenic liquids which can be responsive to either temperature or pressure as may be required.

I claim:

1. A controller for a cryogenic liquid normally in gaseous form and which may be subject to violent ebullition on passing through a flow control valve, comprising a source of cryogenic liquid, a hollow flow control valve body having a top and a bottom, means providing a valve seat surrounding a passage providing communication between a first chamber on one side of said valve seat and a second chamber on the other side of said valve seat, an inlet from said source of cryogenic liquid to one of said chambers, an outlet for the cryogenic liquid from the other of said chambers, a valve head movable toward and from said valve seat, said valve body having a top opening extending from the exterior of said valve body through its top into one of said chambers, a hollow heat exchange body having a top and bottom and having a bottom opening extending from the exterior to the interior of said exchange body through its bottom, a thick rigid insulation block connecting with and interposed between the top of the valve body and the bottom of said heat exchange body substantially closing said top opening of said valve body and said bottom opening of said heat exchange body and forming a top horizontal face and a splash guard for said one of said chambers, a diaphragm extending across the hollow interior of said heat exchange body, means impressing gas under pressure against one side of said diaphragm to actuate the same, and means extending through said insulation block and actuating said valve head in response to movement of said diaphragm.

2. A controller as set forth in claim 1 wherein said valve head moves vertically and said valve head actuating means includes a valve stem projecting through an oversize opening through said insulation block.

3. A controller for a cryogenic liquid normally in gaseous form and which may be subject to violent ebullition on passing through a flow control valve, comprising a source of cryogenic liquid, a hollow flow control valve body having a top and a bottom, means providing a valve seat surrounding a passage providing communication between a first chamber on one side of said valve seat and a second chamber on the other side of said valve seat, an inlet from said source of cryogenic liquid to one of said chambers, an outlet for the cryogenic liquid from the other of said chambers, a valve head movable toward and from said valve seat, said valve body having a top opening extending from the exterior of said valve body through its top into one of said chambers, a hollow heat exchange body having a top and bottom and having a bottom opening extending from the exterior to the hollow interior of said heat exchange body through its bottom, thermal insulation means connecting with and interposed between the top of the valve body and the bottom of said heat exchange body and substantially closing said top opening of said valve body and said bottom opening of said heat exchange body, a diaphragm extending across the hollow interior of said heat exchange body, means impressing gas under pressure against one side of said diaphragm to actuate the same, means extending through said thermal insulation means and actuating said valve head in response to movement of said diaphragm, a bellows in said heat exchange body, means sealingly securing one end of said bellows to said heat exchange body and the other end of said bellows to said means extending through said thermal insulation means to provide a vapor and vapor pressure barrier between said diaphragm and said cryogenic liquid flowing through said valve body.

4. A controller as set forth in claim 3 wherein said means actuating said valve head includes means connecting said bellows to said valve head and to said diaphragm to move them in unison whereby the effective area of said bellows compensates for pressure variations against said valve head.

5. A controller for a cryogenic liquid normally in gaseous form and which may be subject to violent ebullition on passing through a flow control valve, comprising a source of cryogenic liquid, a hollow flow control valve body having a top and a bottom, means providing a valve seat surrounding a passage providing communication between a first chamber on one side of said valve seat and a second chamber on the other side of said valve seat, an inlet from said source of cryogenic liquid to one of said chambers, an outlet for the cryogenic liquid from the other of said chambers, a valve head movable toward and from said valve seat, said valve body having a top opening extending from the exterior of said valve body, through its top into one of said chambers, a hollow heat exchange body having a top and bottom and having a bottom opening extending from the exterior to the hollow interior of said heat exchange body through its bottom, a rigid block of low thermal conductivity composition having a vertical opening therethrough and connecting with and interposed between the top of the valve body and the bottom of said heat exchange body and substantially closing said top opening of said valve body and said bottom opening of said heat exchange body, a diaphragm extending across the hollow interior of said heat exchange body, means impressing gas under pressure against one side of said diaphragm to actuate the same, and means extending through said block and actuating said valve head in response to movement of said diaphragm, and comprising a horizontal disk secured across the interior of said heat exchange body and having a vertical opening in line with said vertical openings through said block, a tubular vertically axially extensible vapor seal bellows having one vertical end sealed to said disk around the opening therein, a vertical pin having one end arranged to contact said diaphragm, means connecting and sealing the other end of said pin to the other end of said bellows, and a vertical valve stem fixed to said valve head and operatively connected to said other end of said bellows.

6. A controller for a cryogenic liquid normally in gaseous form and which may be subject to violent ebullition on passing through a flow control valve, comprising a source of cryogenic liquid, a hollow flow control valve body having a top and a bottom, means providing a valve seat surrounding a passage providing communication between a first chamber on one side of said valve seat and a second chamber on the other side of said valve seat, an inlet from said source of cryogenic liquid to one of said chambers, an outlet for the cryogenic liquid from the other of said chambers, a valve head movable toward and from said valve seat, said valve body having a top opening extending from the exterior of said valve body through its top into one of said chambers, a hollow heat exchange body having a top and bottom and having a bottom opening extending from the exterior to the interior of said heat exchange body through its bottom, thermal insulation means connecting with and interposed between said top of the valve body and the bottom of said heat exchange body and substantially closing said top opening of said valve body and said bottom opening of said heat exchange body, a diaphragm extending across the hollow interior of said heat exchange body, means impressing gas under pressure against one side of said diaphragm to actuate the same, means extending through said thermal insulation means and actuating said valve head in response to movement of said diaphragm, a heat exchanger exposed to ambient temperature, a line connecting the inlet end of said heat exchanger with the interior of said hollow body to receive cryogenic liquid therefrom, a line connecting the outlet of said heat exchanger with the interior of said heat exchange body to deliver gas thereto vaporized from such cryogenic liquid and means providing a restriction to the flow of the cryogenic fluid through said heat exchange body to purge the latter of moisture.

7. A controller for cryogenic liquid normally in gaseous form and which may be subject to violent ebullition on passing through a flow control valve, comprising a source of cyrogenic liquid, a bottom hollow flow control valve body having a top and a bottom, means providing a valve seat surrounding a passage providing communication between a first chamber on one side of said valve seat and a second chamber on the other side of said valve seat, an inlet from said source of cryogenic liquid to one of said chambers, an outlet for the cryogenic liquid from the other of said chambers, a valve head movable toward and from said valve seat, said valve body having a top opening extending from the exterior of said valve body through its top into one of said chambers, a hollow heat exchange body having a top and bottom and a bottom opening extending from the exterior to the interior of said heat exchange body through its bottom, a thick rigid insulation block connecting with and interposed between the top of the valve body and the bottom of said heat exchange body and substantially closing said top opening of said valve body and also said bottom opening of said heat exchange body and forming the sole connecting member contacting both said top of said valve body and said bottom of said heat exchange body, a diaphragm extending across the hollow interior of said heat exchange body, means impressing gas under pressure against one side of said diaphragm to actuate the same, means extending through said insulation block and actuating said valve head in response to movement of said diaphragm and solenoid means for actuating said valve head, comprising a pin mounted for longitudinal movement in said heat exchange body with one end engageable centrally with the side of said diaphragm remote from said valve body and a solenoid mounted on said heat exchange body and actuating said pin to actuate said diaphragm and valve head.

References Cited by the Examiner

UNITED STATES PATENTS

| | | | |
|---|---|---|---|
| 1,920,505 | 7/1933 | Henney et al. | |
| 2,148,383 | 2/1939 | Tyden | 251—46 |
| 2,243,711 | 5/1941 | Lamb | 137—538 X |
| 2,264,306 | 12/1941 | Grove | 137—338 |
| 2,303,244 | 11/1942 | Wedlock | 106—39 X |
| 2,559,116 | 7/1951 | Doschek | 251—130 |
| 2,625,171 | 1/1953 | Wood | 251—61 X |
| 2,823,696 | 2/1958 | Detlefson | 137—340 |
| 3,015,963 | 1/1962 | Terry | 251—134 |
| 3,033,228 | 5/1962 | Mohler | 137—495 |

FOREIGN PATENTS 533,222  9/1955  Italy.

ISADOR WEIL, *Primary Examiner.*

L. LAMBERT, *Assistant Examiner.*